(12) United States Patent
Walker et al.

(10) Patent No.: US 12,164,651 B2
(45) Date of Patent: Dec. 10, 2024

(54) SYSTEM AND METHOD FOR AUTOMATICALLY DETERMINING PRIVACY SETTINGS FOR SHARING DATA

(71) Applicant: THE TORONTO-DOMINION BANK, Toronto (CA)

(72) Inventors: Jennifer Judy Walker, Toronto (CA); Angeli Humilde, Toronto (CA); Balaji Ramachandran, Brampton (CA)

(73) Assignee: THE TORONTO-DOMINION BANK, Toronto (CA)

( * ) Notice: Subject to any disclaimer, the term of this patent is extended or adjusted under 35 U.S.C. 154(b) by 388 days.

(21) Appl. No.: 16/902,491

(22) Filed: Jun. 16, 2020

(65) Prior Publication Data

US 2021/0390190 A1     Dec. 16, 2021

(51) Int. Cl.
| | | |
|---|---|---|
| *G06F 21/62* | (2013.01) | |
| *G06F 21/60* | (2013.01) | |
| *G06Q 30/0207* | (2023.01) | |
| *G06Q 50/26* | (2012.01) | |
| *G06Q 30/0226* | (2023.01) | |

(52) U.S. Cl.
CPC ....... *G06F 21/604* (2013.01); *G06Q 30/0215* (2013.01); *G06Q 30/0224* (2013.01); *G06Q 30/0236* (2013.01); *G06Q 50/265* (2013.01); *G06Q 30/0226* (2013.01); *G06Q 2220/00* (2013.01)

(58) Field of Classification Search
CPC .. G06F 21/604; G06F 21/566; G06F 21/6254; G06Q 30/0215; G06Q 30/0224; G06Q 30/0236; G06Q 50/265; G06Q 30/0226; G06Q 2220/00
See application file for complete search history.

(56) References Cited

U.S. PATENT DOCUMENTS

| | | |
|---|---|---|
| 8,646,032 B2 | 2/2014 | Aad et al. |
| 8,826,446 B1 | 9/2014 | Liu et al. |
| 8,898,730 B1 | 11/2014 | Fredinburg et al. |

(Continued)

OTHER PUBLICATIONS

Privacy Considerations for Risk-Based Authentication Systems, Stephan Wiefling, IEEE, p. 6 (Year: 2021).*

(Continued)

*Primary Examiner* — Michael Bekerman
*Assistant Examiner* — Darnell A Pouncil

(57) ABSTRACT

Systems and methods are provided for managing and rewarding sharing of user data via a computing device with a requesting device. A privacy risk score is received for the requesting device characterizing a degree of cyber risk for sharing data. Initial privacy settings are received for the user via a GUI in response to the privacy risk score characterizing the user data allowable for sharing. A reward incentive is then automatically determined based on the privacy risk and the initial privacy settings for sharing additional user data with the requesting device beyond that identified by the initial privacy settings. Then, in response to an override from the GUI overriding the initial privacy settings to accept the reward incentive and thereby allow sharing of the additional user data beyond the initial range: updated privacy settings are determined and the sharing of the user data is limited to the updated privacy settings.

21 Claims, 6 Drawing Sheets

(56) References Cited

U.S. PATENT DOCUMENTS

| | | | |
|---|---|---|---|
| 9,317,807 | B1 | 4/2016 | Staddon et al. |
| 2012/0210244 | A1 | 8/2012 | de Francisco Lopez et al. |
| 2013/0268357 | A1* | 10/2013 | Heath .................... G06Q 10/10 |
| | | | 726/26 |
| 2016/0099963 | A1* | 4/2016 | Mahaffey ................ H04L 69/14 |
| | | | 726/25 |
| 2016/0105448 | A1* | 4/2016 | Szabo ................. G06F 21/6245 |
| | | | 726/27 |
| 2019/0080113 | A1 | 3/2019 | Kim et al. |
| 2019/0303586 | A1* | 10/2019 | Mahaffey ............ H04L 63/1408 |
| 2020/0026876 | A1 | 1/2020 | Garg et al. |
| 2021/0390196 | A1* | 12/2021 | Lavine .................. H04L 63/102 |

OTHER PUBLICATIONS

Ferdous, Md Sadek, Soumyadeb Chowdhury, and Joemon M. Jose. "Analysing privacy in visual lifelogging." Pervasive and Mobile Computing 40 (2017): 430-449.

* cited by examiner

SYSTEM AND METHOD FOR AUTOMATICALLY DETERMINING PRIVACY SETTINGS FOR SHARING DATA

FIELD OF INVENTION

The present invention relates to computer-implemented systems and methods for automatically managing sharing of data using privacy settings and more particularly to dynamically providing incentives to affect the sharing.

BACKGROUND OF THE INVENTION

Generally, managing sharing of online information including a user's personal data including personal identification information such as birth date, social security/insurance information, financial information, e-commerce information, a user's online presence activity, etc. for online users while also protecting their privacy and controlling the security risks can be a difficult task. This requires significant effort and understanding of each individual's privacy needs as compared to the types of information requested from an online devices or website providers. Additionally, because there is no consistent amount or type of information typically requested for sharing then fixed privacy settings for online users are neither useful nor reliable as they end up sharing incorrect amount of information and risking the privacy of users. Simply, fixed privacy settings cannot adjust to changing needs and interests of a user while communicating with requesting devices or resources.

Accordingly, there is a need to provide a method and system to assist an online user of a computing device to automatically manage privacy settings and sharing of data in a dynamic and real-time manner while allowing dynamic incentives of additional sharing of information.

SUMMARY OF THE INVENTION

According to an aspect of the present invention there is provided a system and a method which automatically determine privacy settings for controlling sharing of a user's personal data in real-time via a computing device when interacting with requestors, such as websites and their webpages. The systems and methods may allow a user to set initial privacy settings (e.g. via a GUI) indicating the type of information for sharing with other devices (e.g. social insurance number, birthdate, etc.). The systems and methods also track a user's past online behavioural sharing patterns indicating the amount and type of shared information in a past time frame (e.g. with various types of online sites including e-commerce websites, social media websites, etc.). The system then automatically predicts current privacy settings based on the initial privacy settings and the behavioural sharing patterns. In one aspect, the current privacy settings are further updated based on behavioural sharing patterns and current privacy settings of other users determined to be similar to the user.

There is provided a computing device having a processor coupled to a memory and coupled to an I/O device for managing sharing of user data associated with a user via the computing device when interacting online with a requesting device, the memory storing instructions, which when executed by the processor configure the computing device to: receive a privacy risk score associated with the requesting device, the privacy risk score characterizing a degree of cyber risk for sharing data with the requesting device at a current time; receive initial privacy settings for the user via a graphical user interface (GUI) of the I/O device in response to presenting the privacy risk score on the GUI, the initial privacy settings identifying an initial range of desired privacy characterizing the user data allowable for sharing with the requesting device; automatically determine and present on the GUI, a reward incentive based on the privacy risk score and the initial privacy settings associated with sharing additional user data with the requesting device beyond that identified by the initial privacy settings, the reward incentive being correlated to a degree of the additional user data shared; upon receiving an override indication from the GUI overriding the initial privacy settings to accept the reward incentive and thereby allow sharing of the additional user data beyond the initial range, then: determine updated privacy settings based on the override indication; and dynamically manage sharing of the user data with the requesting device to limit to that allowed based on the updated privacy settings.

In one aspect, sharing of the user data to limit to that allowed comprises the processor being further configured to: limit to only selected one or more data types defined by the updated privacy settings.

In yet another aspect, the reward incentive is determined further based on a pre-defined value associated with each type of the user data shared online.

In yet another aspect, the reward incentive is a digital asset selected from a group comprising: loyalty points, rewards points, cryptocurrency, and cash.

In yet another aspect, the data type of the user data is selected from a possible set of types comprising: online presence information, user name, social insurance number, date of birth, and identification information from the user data that is allowable for sharing online.

In yet another aspect, in response to interacting online with the requesting device, the processor is further configured to: obtain the privacy risk score for the requesting device from an intermediary device in communication with the computing device and the requesting device, the privacy risk score dependent upon at least one of: a device type for the requesting device and a location of the requesting device relative to the computing device; and wherein dynamically managing sharing of the user data to limit to only the selected one or more data types based on the updated privacy settings is further permitted based on the privacy risk score being below a defined threshold to permit said sharing.

In yet another aspect, if the privacy risk score is below the defined threshold but above a second defined threshold, the processor is further configured to: adjust the sharing of the user data defined by the updated privacy settings to further limit to only a subset of the selected one or more data types.

In yet another aspect, the requesting device is a device connected online to the computing device and configured to request the user data while interacting online, the requesting device selected from a group comprising: a mobile device; an augmented reality device; a virtual reality device; a personal computer; a server hosting one or more websites; an internet of things (IoT) device; and a personal digital assistant.

In yet another aspect, the processor is further configured for updating the initial privacy settings subsequent to the current time based on: obtaining a behaviour map for the user associated with the user data over a past time period from the current time, the behaviour map characterizing online sharing activity of prior user data and comprising a set of past data types shared and indicating a number of times the set of past data types have been shared online in the past time period; and updating the initial privacy settings in real-time based on the behaviour map and thereby the reward incentive.

In yet another aspect, the processor is further configured to automatically update the initial privacy settings further based on: retrieving a set of attributes characterizing the user; determining at least one other user of another computing device having a profile with attributes similar to the user; obtaining a second behaviour map for the at least one other user over a second past time period, the second behaviour map comprising a second set of past data types shared online by the at least one other user during the second past time period; and further updating the initial privacy settings based on the second behaviour map.

There is provided a computer implemented method for managing sharing of user data associated with a user via a computing device when interacting online with a requesting device, the method comprising: receiving a privacy risk score associated with the requesting device, the privacy risk score characterizing a degree of cyber risk for sharing data with the requesting device at a current time; receiving initial privacy settings for the user via a graphical user interface (GUI) in response to presenting the privacy risk score on the GUI, the initial privacy settings identifying an initial range of desired privacy characterizing the user data allowable for sharing with the requesting device; automatically determining and presenting on the GUI, a reward incentive based on the privacy risk score and the initial privacy settings associated with sharing additional user data with the requesting device beyond that identified by the initial privacy settings, the reward incentive being correlated to a degree of the additional user data shared; upon receiving an override indication from the GUI overriding the initial privacy settings to accept the reward incentive and thereby allow sharing of the additional user data beyond the initial range, then: determining updated privacy settings based on the override indication; and dynamically managing sharing of the user data with the requesting device to limit to that allowed based on the updated privacy settings.

BRIEF DESCRIPTION OF THE DRAWINGS

These and other features of the invention will become more apparent from the following description in which reference is made to the appended drawings wherein.

DETAILED DESCRIPTION

One or more currently preferred embodiments have been described by way of example. It will be apparent to persons skilled in the art that a number of variations and modifications can be made without departing from the scope of the invention as defined in the claims.

Figure 1:
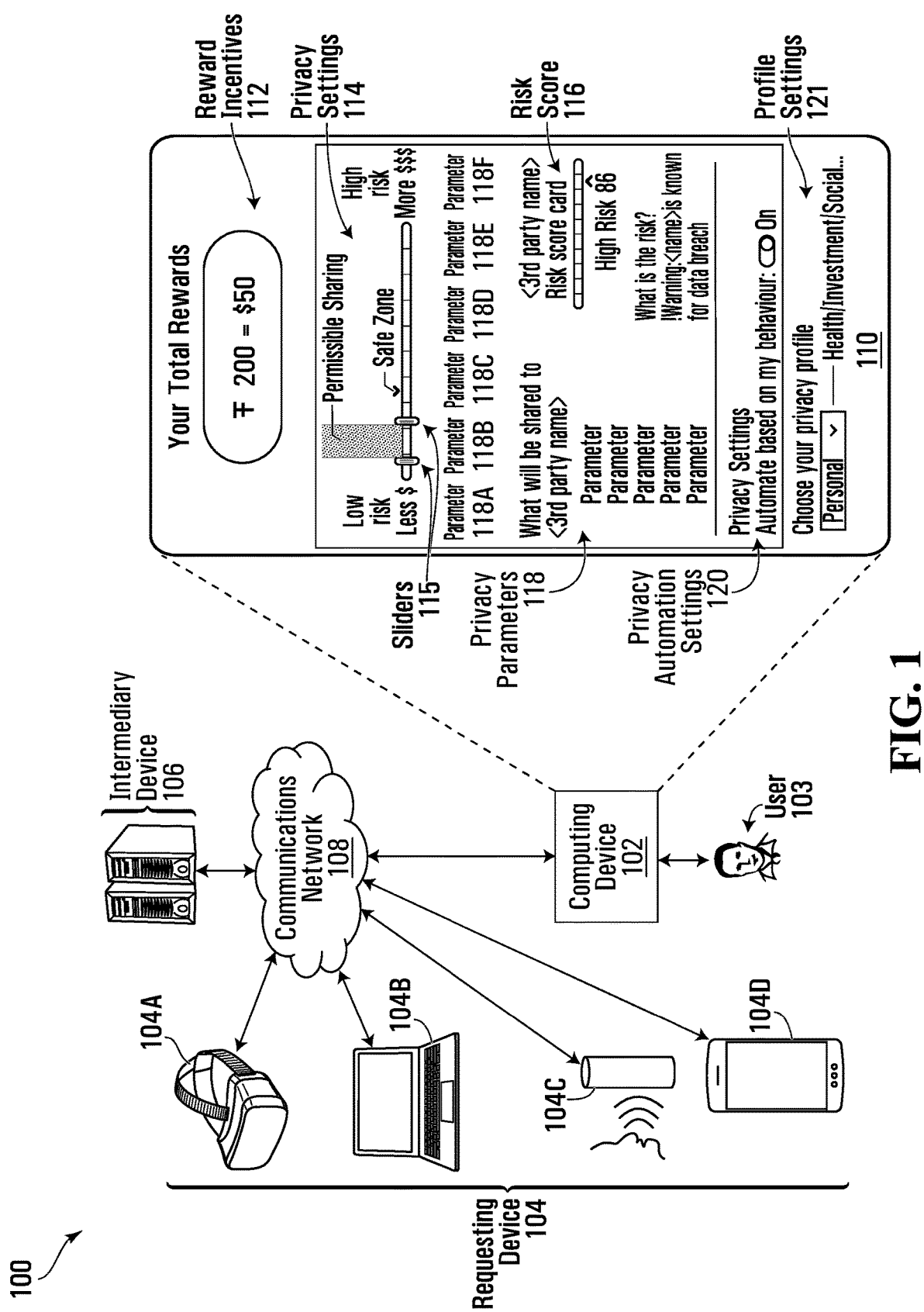
FIG. 1 is a block diagram of a representative computer system network also showing details of an example computing device and output screen, in accordance with one or more aspects of the present disclosure.

FIG. 1 is a block diagram of a representative computer system 100 illustrating a computing device 102 in accordance with an example of the teachings herein, communicating via one or more communication networks 108 and configured to automatically manage and control sharing of personal user data for a user 103. The personal user data that is managed and controlled may be shared with one or more other requesting devices 104 (e.g. augmented or virtual reality device 104A, personal laptop device 104B, digital voice personal assistant device 104C, and mobile device 104D) and their associated resources (e.g. websites hosted by requesting devices 104). Other types of requesting devices 104 and associated resources may be envisaged, in accordance with one or more aspects of the presented disclosure. The computing device 102 communicates with requesting devices, collectively 104, via a communications network 108 either directly or indirectly via an intermediary device 106. The intermediary device 106 may be configured to share additional information to facilitate managing of sharing of data by the device 102, such as providing metadata regarding cyber privacy risks for the requesting devices 104 and/or a resource associated with the requesting devices 104 and possible rewards (e.g. loyalty points) for sharing data with the requesting devices 104.

FIG. 1 shows an enlargement of a graphical user interface screen 110 presented on the computing device 102, in accordance with one or more aspects of the present disclosure. The graphical user interface screen 110 is configured to display interactive privacy settings, risks for requesting devices 104 and possible corresponding reward incentives 112 for sharing each type of user data (e.g. identified as privacy parameters 118) as a way to automatically control and manage user data shared with the requesting devices 104 while rewarding sharing of the user data.

Thus, in accordance with one or more aspects, the computing device 102 is configured to present the graphical user interface screen 110 for presenting relevant data to the user 103 to facilitate managing the data that is shared by computing device 102 and reporting same. For example, the screen 110 may display privacy settings 114 and privacy parameters 118 for subsequent user interaction and manipulation. The privacy settings 114 characterize a defined privacy range defining one or more types of user data allowable for sharing with the requesting devices 104 shown as privacy parameters 118 (shown individually as parameters 118A-118F). The privacy parameters 118 may include but not limited to: name, address, social insurance number, birthdate, account number, identification numbers, medical data, and other personal information available for sharing for the user 103. For example, the medical data can include electronic health care related data (e.g. patient medical records), health monitoring data obtained from smart devices (e.g. fitness tracker), or other related data as may be envisaged by a skilled person. In some aspects, the privacy parameters 118 (e.g. 118A-118F, collectively 118) include digital documents including personal information (e.g. travel documents, property purchase documents, insurance documents, e-commerce receipts, financial statements, etc.) or other types of digital documents as may be envisaged by a skilled person.

Thus, the computing device 102 is configured to allow a user to select, via a graphical user interface (e.g. the screen 110), initial privacy settings 114 identifying a privacy parameter range (e.g. 118A-118B) corresponding to types of personal user data (e.g. social insurance number, birthdate, . . . ) acceptable for sharing with other requesting devices 104 for the user 103.

The privacy settings 114 shown on the screen 110 define the user's current privacy level in sharing a range of personal user data (e.g. allowable sharing parameter range for e-commerce webpages includes personal identification parameters 118A, 118B, and 118C). As shown in FIG. 1, after setting the initial privacy settings 114, the privacy settings may be automatically updated by the methods described herein based on selecting the privacy automation settings 120 toggle on the screen 110. As will be described below, this allows the initial privacy settings 114 to be used for forecasting privacy settings (e.g. for generating new privacy settings 114 to be displayed on the screen 110) from current time to a future time, in one aspect based on the user's online data sharing activity of the personal user data. Updating the privacy settings data automatically will be further described with reference to FIG. 3.

The screen 110 may further display a risk score 116 characterizing a degree of cyber risk associated with sharing personal data and/or specifically data encompassed by the parameters 118. The risk score 116 provides a current risk for the requestor. The risk score 116 may indicate for example that there is a high risk in sharing certain types of data (e.g. parameters 118) with a particular requesting device 104B as such device has had previous security data breaches and is untrustworthy or may be known for unauthorized transfer of data to third party resources (e.g. software applications). The screen 110 further displays one or more reward incentives 112 dynamically updated to depict one or more measures of how sharing additional information beyond those defined by the privacy settings 114 may be rewarded. For example, by manipulating the sliders 115 on the privacy settings 114 (e.g. to share additional data beyond the initial privacy settings 114 that define sharing parameter 118A and parameter 118B) results in presenting the particular reward incentive 112. As shown, screen 110 may further display a selection icon (e.g. a drop down menu is shown by way of example) for selecting a particular privacy profile for the user 103 shown as profile settings 121 and thereby causing the display of the corresponding screen. By selecting one of the profile settings 121, a user can navigate from a selected privacy profile (e.g. "personal") to other types of privacy profiles (e.g. health, investment, social) which can allow viewing relevant corresponding privacy settings 114 for sharing other types of information (e.g. health related) and associated risks for sharing such information. As can be envisaged, by selecting a new privacy profile from profile settings 121, one or more new screens may be displayed similar to the screen 110. The new screen corresponding to a selected privacy profile displays corresponding privacy settings 114, privacy parameters 118, reward incentives 112, and risk score 116 for one or more requesting device(s) 104 and/or associated resources.

Computing device 102 is coupled for communication with requesting devices 104 and/or intermediary devices 106 via communication networks 108, which may be a wide area network (WAN) such as the Internet. It is understood that communication networks 108 are simplified for illustrative purposes. Additional networks may also be coupled to the WAN or comprise communication networks 108 such as a wireless network and/or a local area network (LAN) between the WAN and computing device 102 or between the WAN and any of requesting devices 104.

Computing device 102 receives respective query data from respective requesting devices 104 or from other devices on their behalf, such as network 108. In some examples, the user data provided from the computing device 102 to the requesting devices 104 in response to a request may be in the form of one or more of a text of characters, a sound recording of characters, or an image of the characters, or a digital document (e.g. pdf, word, etc.). Similarly, queries for the personal user data from the requesting device 104 may be in text, audio, video or a natural language (e.g. see requesting device 104C being a digital voice assistant as an example) or other formats envisaged by a skilled person.

Figure 2:
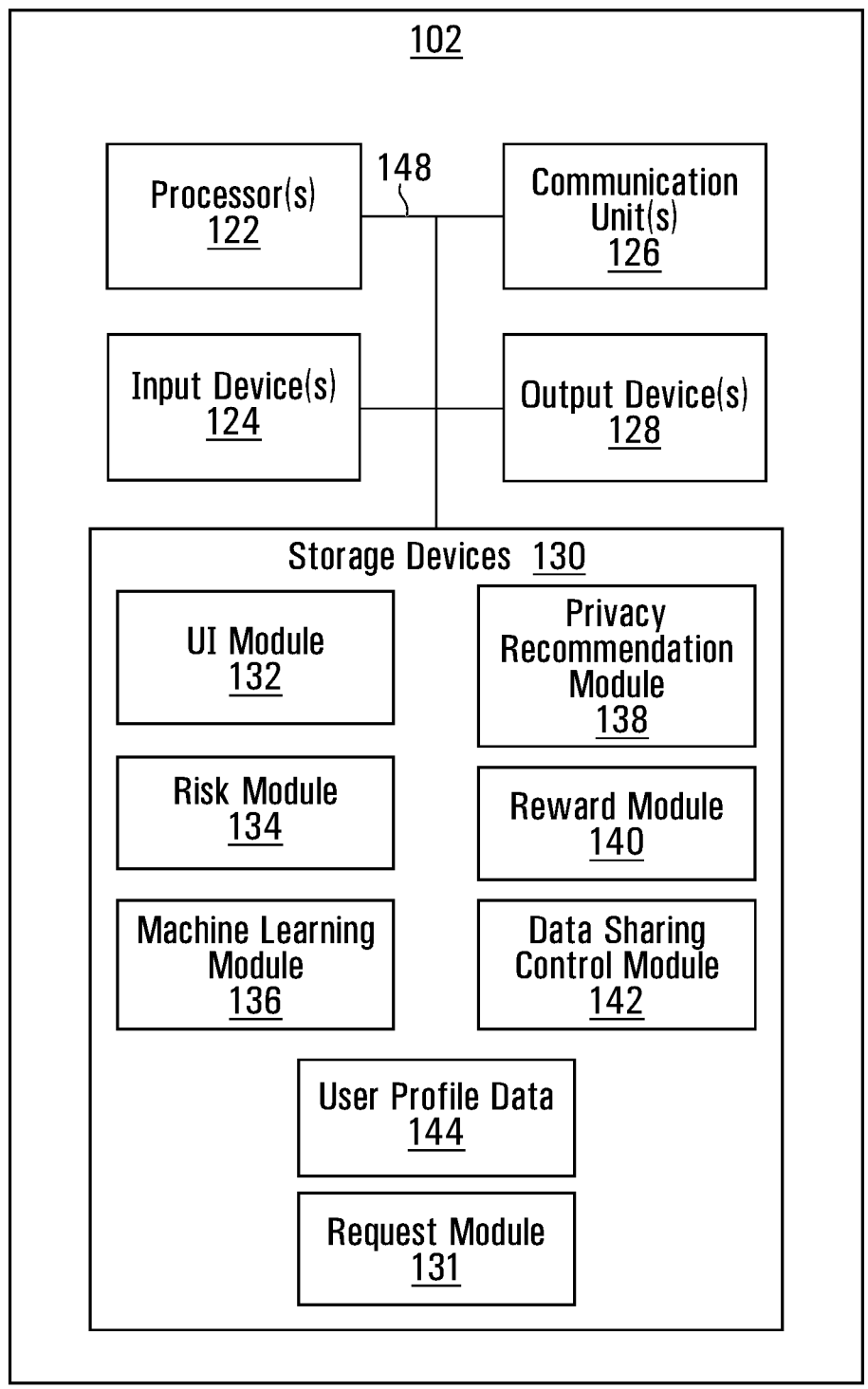
FIG. 2 is a block diagram further illustrating the computing device of FIG. 1, in accordance with one or more aspects of the present disclosure.

Referring now to FIG. 2, the computing device 102 comprises one or more processors 122, one or more input devices 124, one or more communication units 126 and one or more output devices 128. Computing device 102 also comprises one or more storage devices 130 storing one or more software and/or hardware modules for automatically managing and controlling sharing of information from the computing device 102 to requesting devices 104 (e.g. upon browsing a website on a particular requesting device 104B) and for implementing the aspects described herein via the processor 122. The modules on the storage devices 130 comprise: request module 131, a user interface (UI) module 132, a risk module 134, a machine learning module 136, a privacy recommendation module 138, a reward module 140, a data sharing control module 142, and a user profile data 144. Processors 122 may implement functionality and/or execute instructions within computing device 102. For example, processors 122 may be configured to receive instructions and/or data from storage devices 130 to execute the functionality of the modules shown in FIG. 2 and by way of example, provide output screens 110 shown in FIG. 1.

Communication channel 148 may couple each of the modules 122, 124, 126, 128, 131, 132, 134, 136, 138, 140, 142, and 144, for inter-component communications, whether communicatively, physically and/or operatively. In some examples, communications channels 148 may include a system bus, a network connection, and inter-process communication data structure, or any other method for communicating data.

One or more communication units 126 allow the computing device 102 the capability to communicate with one or more requesting devices 104 and/or intermediary device(s) 106 via one or more networks (e.g. communications network 108) by transmitting and/or receiving network signals on the one or more networks. The communication units may include various antennae and/or network interface cards, etc. for wireless and/or wired communications.

Input devices 124 and output devices 128 may include any of one or more buttons, switches, pointing devices, one or more cameras, a keyboard, a pointing device, a microphone, one or more sensors (e.g., biometric, etc.), a speaker, a bell, one or more lights, a display screen (which may be a touchscreen device providing I/O capabilities), etc. One or more of same may be coupled via a universal serial bus (USB), Bluetooth™ or other communication channels (e.g., 126). That is, input and output devices may be on computing device 102 or coupled thereto via wired or wireless communication.

Computing device 102 may store data/information to storage devices 130, which may comprise, for example, data from machine learning trained processes (e.g. resulting from machine learning module 136), previous requests for information from requesting devices 104, previous responses to the requests providing controlled sharing of information from the computing device 102, various inputs received on the screen 110 relating to modification of privacy settings 114, acceptance or rejection of suggested reward incentives 112, and the results of whether automatically provided privacy recommendations have been successfully accepted or not.

Some of the functionality is described further herein below. The one or more storage devices 130 may store instructions and/or data for processing during operation of computing device 102. The one or more storage devices 130 may take different forms and/or configurations, for example, as short-term memory or long-term memory. Storage devices 130 may be configured for short-term storage of information as volatile memory, which does not retain stored contents when power is removed. Volatile memory examples include random access memory (RAM), dynamic random access memory (DRAM), static random access memory (SRAM), etc. Storage devices 130, in some examples, also include one or more computer-readable storage media, for example, to store larger amounts of information than volatile memory and/or to store such information for long-term, retaining information when power is removed. Non-volatile memory examples include magnetic hard discs, optical discs, floppy discs, flash memories, or forms of electrically programmable memory (EPROM) or electrically erasable and programmable (EEPROM) memory.

Request module 131 may be configured to receive queries for personal user data from respective requesting devices 104 and their associated resources to initiate the process of automatically determining which privacy data can be shared (e.g. via data sharing control module 142).

The query from the requesting devices 104 may be received at the request module 131 electronically via communication unit(s) 126 if it is a text query, in the form of images of characters, or interpreted via an audio to text module (not shown) if the query is in the form of sounds of characters.

UI Module

The UI Module 132 may be configured to receive one or more inputs from the user 103 for example, in interacting with one or more screen elements displayed in the screen 110. As shown for example, the user 103 may define initial privacy settings 114 for the user via a graphical user interface shown in screen 110. This may include using the sliders 115 to define an initial range of desired privacy for the user data including setting the parameter range for user data that the user 103 is willing to share (e.g. share parameters 118A and 118B). The range of privacy defined by the privacy settings 114 may be specific to corresponding types of requesting resource or device. For example, the privacy settings 114 may be set differently based on whether an e-commerce website is accessed by the computing device 102 or whether a health related website is accessed.

Risk Module

The risk module 134 may be configured to calculate a privacy risk score 116 associated with the requesting device 104 (or a particular resource associated therewith) querying for user data from the computing device 102. The privacy risk score may be pre-defined based on a type of the requesting device 104. For example, augmented reality devices 104A may be pre-assigned a first risk score; digital voice assistant devices 104C may be assigned a second risk score; personal computing devices 104B a third risk score, etc. Similarly, a software application or a resource that is the source of the query for the requesting device 104 may also be pre-assigned a risk score. As an example, if the requesting source is a website (e.g. hosted on the device 104B and accessed by the computing device 102) then similarly, different types of websites (e.g. e-commerce, health, education, etc.) may be pre-defined with a corresponding privacy risk score. Other factors used to determine the privacy risk score 116 may include: a location of the requesting device 104 (e.g. proximity of location to the computing device 102 may indicate a lower risk score such as where the computing device 102 and the requesting device 104 co-exist on a same local network). Yet another factor to determine the privacy risk score 116 may include prior history of access of user data, either for the current user 103 or other similar users, by the requesting device (e.g. device 104A known for security breaches so the risk score should be in the higher range). Preferably, the risk module 134 tracks a history of data breaches for the requesting devices 104 (e.g. as obtained from intermediary device 106) and forecasts, using predictive machine learning methods with predictive modelling such as regression, random forest, recurrent neural networks, convolutional neural networks (or other such machine learning methods envisaged by a skilled person) the risk score 116 accordingly. The risk module 134 may further be a trained machine learning model which has been trained based on correlations of location information, device type and security history of specific requesting device 104 (or associated resource such as e-commerce website) to predict the risk score 116.

It is noted herein that although for the purpose of simplicity in FIG. 1, the query for personal user data originates from a requesting device 104, the query for user data may be associated with a software application (e.g. a health insurance receipt submission application), a resource associated with the requesting device (e.g. printer, fax machine, scanner, etc.) or one or more websites (e.g. social network, e-commerce, insurance, educational, financial institution, etc.) hosted by a server such as one of the requesting devices 104 and the website navigated to by the computing device 102. In yet another example, the requesting device 104 which interacts with the computing device 102 to receive personal user data (e.g. in response to a request or a push notification as controlled by the privacy settings 114) includes IoT (internet of things) devices such as non-standard computing devices which communicate wirelessly across the network 108 with the computing device 102. Examples of such internet of things devices can include but not limited to: smart television devices, smart speakers, smart toys, smart wearable devices, smart appliances (e.g. toaster, fridge, etc.), smart meters, smart security systems, smart heating and cooling system, smart lighting, and smart sensors. In one embodiment, the privacy parameters 118 may relate to data gathered for the user 103 in interacting with one or more IoT devices.

Privacy Recommendation Module

Figure 3:
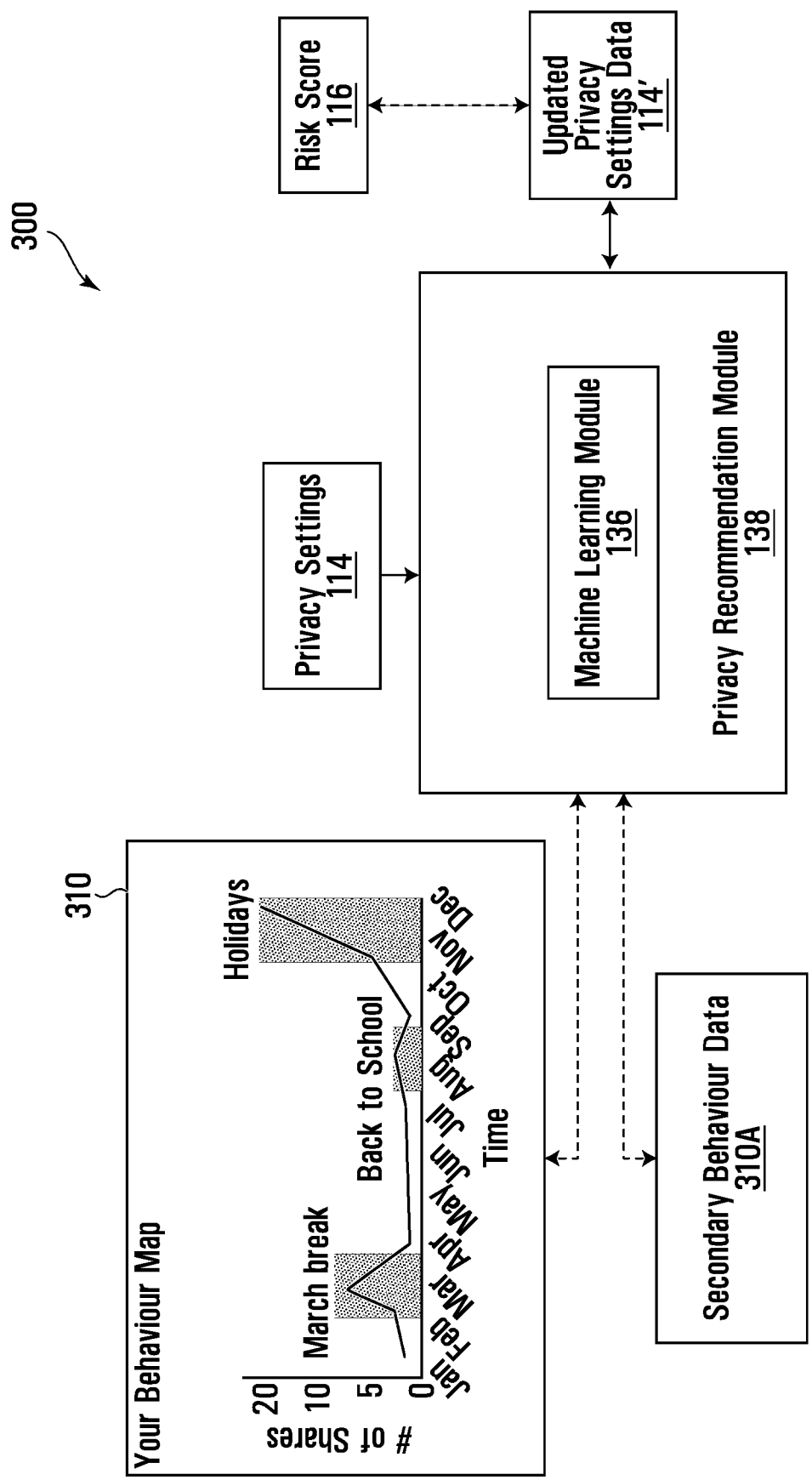
FIG. 3 is a block diagram illustrating further detail of FIG. 2 according to an embodiment of the privacy recommendation module, in accordance with one or more aspects of the present disclosure.

Referring to FIGS. 2 and 3, the privacy recommendation module 138 may be configured to automatically determine updating the initial privacy settings 114 to current settings, e.g. updated privacy settings 114' based on predicting the user's current data sharing behaviour from prior data sharing behaviour, and in some aspects, further based on user behaviour from other similar users.

Thus, the privacy recommendation module 138 receives initial privacy settings 114 input by a user via the UI module 132, the initial privacy settings defining parameters 118 that the user is desirous of sharing with a corresponding requesting device 104.

As shown in FIG. 3, the privacy recommendation module 138 may be configured to receive a history of the user's sharing behaviour 310 indicating prior sharing activity. The behaviour map 310 may indicate for example, a number of times the user 103 has shared user information over a past time period from the current time with one or more requesting devices 104 and may further indicate the type(s) of user information shared.

Preferably, the behaviour map 310 characterizes online sharing activity of prior user data over the past time period and comprises a set of past data types (e.g. privacy parameters 118) shared and indicating a number of times the past data types have been shared online in the past time period with the corresponding requesting device 104.

The behaviour map 310 thus characterizes the user's sharing pattern of personal user data (e.g. when previously interacting with one or more requesting devices 104 including webpages such as social media, e-commerce, etc.) in a past timeframe up to the current time. The behaviour map 310 metadata may further indicate whether the user 103 previously overrode initial privacy settings 114 and allowed sharing of additional information for the personal user data beyond the initial privacy settings 114.

In one or more aspects, the privacy recommendation module 138 is further configured to generate the updated privacy settings 114' based on trends and behaviours related to sharing of user data with the requesting devices 104 as examined from other users' activity considered similar to current user. Such information regarding related users may be provided via the secondary behaviour data 310A. The secondary behaviour data 310A provides other privacy settings for related other users determined similar to the user 103 based on similar attributes (e.g. user's attributes, including age/zip code/financial status/legal status, etc.). In this way, the privacy recommendation module 138 utilizes the other privacy settings provided in the secondary behaviour data 310A in addition to the initial privacy settings 114 and the behaviour map 310 of the user to forecast a current and updated privacy setting 114' when responding to the query for information from the requesting device 104.

For example, the secondary behaviour data 310A for at least one other user having similar attributes to the user 103 includes a second behaviour map comprising a second set of past data types shared online the other user during a second past time period and corresponding frequency of sharing. This is for use by the machine learning module 136 in generating the updated privacy settings data 114'.

Specifically, as shown in the process 300 of FIG. 3, the privacy recommendation module 138 may contain a machine learning engine 136, using one or more prediction machine learning models as may be envisaged by a person skilled in the art to predict updated privacy settings data 114'. For example, the machine learning engine 136 may use machine learning models (e.g. regression or pattern classification) to consider the initial privacy settings 114, the behaviour data 310 characterizing prior sharing behaviour for the user 103 and the secondary behaviour data 310A characterizing prior sharing behaviour for other users (e.g. having a profile with attributes similar to the user) to automatically provide a recommendation of an updated privacy settings data 114'.

In one example, the machine learning module 136, may use the behaviour 310 data and the secondary behaviour data 310A indicating respectively data sharing behaviour for both the user and other similar users (e.g. as associated with particular types of data shared and particular requesting device 104 including resources such as websites) as training data for training the machine learning module 136 the trained model used for predicting updated privacy settings data 114'.

Thus, machine learning algorithm of the machine learning module 136 attempts to find optimal privacy settings to accurately reflect the user's currently predicted sharing data behaviour in real-time via the updated privacy settings data 114'.

In one aspect, the machine learning module 136 is a regression method using one or more of linear regression, logistic regression, and polynomial regression. In another aspect, the machine learning algorithm is a supervised classification using one or more of neural network, support vector machine, linear or quadratic discriminate analysis, and boosting. In another aspect, the machine learning algorithm is unsupervised classification using one or more of k-means (clustering), Gaussian mixture models, and principal or independent component analysis.

Reward Module

Figure 4:
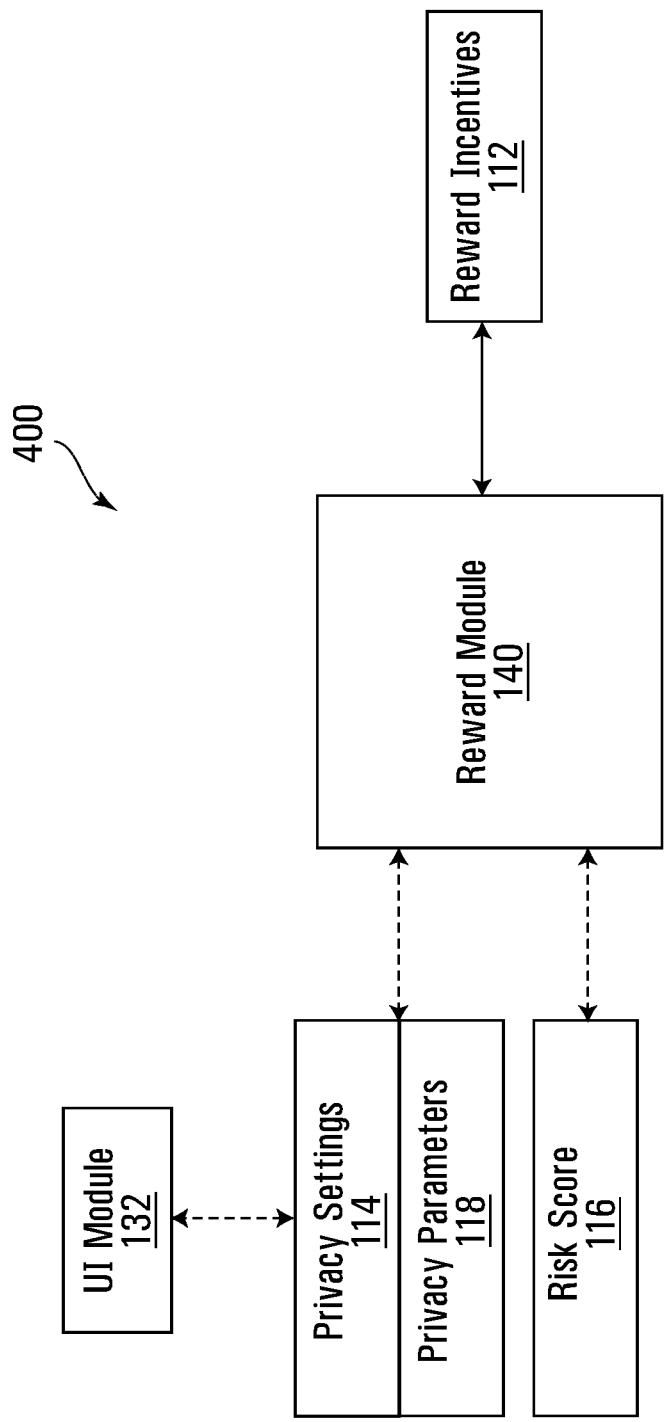
FIG. 4 is a block diagram illustrating further detail of FIG. 2 according to an embodiment of the reward module, in accordance with one or more aspects of the present disclosure.

Referring to FIGS. 1, 2 and 4 the reward module 140 may be configured to automatically calculate and present reward incentives 112 for the privacy settings 114 on the screen 110 for a user to view and accept or note. That is, in one example, by the user manipulating the displayed privacy settings 114 to expand the shared data types (e.g. parameters 118) to beyond the current shared data types such as to share additional data, the screen will display the reward incentives 112 associated with the changed privacy settings 114. In this way, the user screen 110 provides a dynamic way of viewing, in real-time, possible reward incentives 112 associated with different privacy settings 114 such as to allow trading up the reward incentives by accepting to share additional user data types as defined by the parameters 118 and the privacy settings 114.

Referring to FIG. 4, shown is a process 400 showing more detail of the interactions of the reward module 140 in FIG. 2 for generating the reward incentives 112. The reward module 140 receives risk score 116; privacy settings 114 and associated privacy parameters 118 to determine reward incentives 112. For example, the reward module 140 is configured to provide a higher reward incentive for a higher amount of risk defined in the risk score 116. That is, if a particular website (e.g. hosted by the requesting device 104) is accessed by the computing device 102 thereby requesting access to certain personal user data and the particular website is known for prior security data breaches therefore having a high-risk score 116 then a corresponding weighting is applied to increase the reward incentive 112 to correspond to the higher risk. Furthermore, the reward module 140 may be configured to apply a weighting to increase or decrease the reward incentive 112 based on an amount and/or type of additional user data which the computing device 102 allows for sharing (e.g. as accepted on the screen 110). For example, certain types of additional user data (e.g. privacy parameters 118) such as personal identifying user information which are less likely to be shared may be more valuable to the requesting device 104 and thus have assigned a higher reward value. Additionally, when the current privacy settings 114 initially indicate that the user is only willing to share certain parameters (e.g. privacy parameters 118A and 1186) and the privacy settings 114 are modified on the user screen 110 to share all of the privacy parameters 118A-118F then a corresponding reward incentive 112 is determined. Then in this example, the additional amount of the user data shared may proportionately increase the reward incentive 112 via the reward module 140 by applying an increased weighting to the reward incentive 112 to compensate for the additional sharing of data. Similarly, if the amount of user data to be shared is decreased via adjusting the sliders 115 and thus the privacy settings 114 to share less privacy parameters 118, then the reward module 140 is configured to decrease the reward incentive 112 accordingly.

Thus, when the computing device 102 navigates to a website and the device 102 presents the default privacy settings 114 and the associated reward incentives 112, the reward module 140 may be configured to adjust the reward incentive 112 based on the risk score 116 associated with the website (e.g. high risk resulting in higher reward; low risk resulting in reduction of reward). Similarly, the reward module 140 may further provide a weighting in response to an adjustment of the privacy settings 114 received on the UI module 132 indicating: adjusting the number of types (e.g. privacy parameters 118 in FIG. 1) of personal user data shared such that in one example, an increase in the number of privacy parameters 118 to be shared results in an increase in the reward incentive 112. Furthermore, adjusting the types of privacy parameters 118 shared to share certain privacy parameters 118 pre-defined as valuable for the website may result in corresponding adjusting the reward incentive 112 to cause an increase accordingly.

The reward incentive 112 may be a digital asset selected from the group comprising: electronic gift cards, electronic coupons, electronic rebates, virtual tokens, loyalty points, rewards points (e.g. frequent flyers points), cryptocurrency, cash, or other electronic incentives such that once the computing device 102 agrees to the privacy settings 114 and/or completes the transfer of the user data, the reward incentives 112 may be deposited in an account associated with the user 103. For example, the reward incentive 112 may be bitcoin currency and automatically added to digital wallet of the computing device 102 associated with the user 103. For example, the digital assets may be redeemed for other goods, rewards, products, services, etc.

In yet another embodiment, the rewards incentive 112 may include a service to be provided by a third party device (e.g. the intermediary device 106) in response to sharing personal user data with the requesting device 104 and/or the intermediary device 106. The service may include for example a money transfer service; money exchange services or any other electronic services (e.g. online subscriptions, access to online website resources, access to software application services, cloud computing services, etc.).

Data Sharing Control Module

Referring again to FIG. 2, subsequent to presenting the screen 110 including the privacy settings 114, reward incentives 112, and the privacy risk score 116 in accordance with the modules described herein, the data sharing control module 142 is configured to determine, based on a current privacy settings (e.g. privacy settings 114 or updated privacy settings 114') the user data to share from the computing device 102 for the particular requestor, e.g. requesting device 104 (or associated resource). That is, the data sharing control module 142 is configured to determine whether to permit sharing of each of the types of the personal user data. The data sharing control module 142 is thus further configured to compare the type(s) of user data information requested from the requesting device to the current privacy settings (e.g. 114 or 114') to determine whether there is any match and whether to permit data sharing of underlying user data associated with one or more of the privacy parameters 118 with the particular website (or other resource of the requesting device 104).

Thus the selected privacy settings 114 are for subsequent use by data sharing control module in controlling an amount and/or type of data sharing when accessing a requesting device 104, e.g. browsing a particular website. Notably, the selected privacy settings 114 further include privacy parameters 118 to indicate type(s) of personal user data (e.g. SIN, birthdate, username, other identification information) acceptable for sharing with the particular website from the current time.

Thus, a query for user information may be initiated by the user 103 navigating to a website or accessing a resource hosted by a corresponding requesting device 104. The website visited may thus query for specific types of personal user information from the computing device 102. The computer device 102 will then determine, via the data sharing control module 142, the amount/type of data to be shared and negotiate privacy settings either automatically (e.g. based on user's online data sharing behaviour with other similar websites; other similar user's behaviours, etc.) or with user input by offering rewards incentives for consideration and possible acceptance. The amount/type of personal user data to be shared from the computing device 102 may be further modified based on privacy risks indicated in the risk score 116 for the requestor as provided by the risk module 134.

In at least one embodiment, the computing device 102 is further configured to display on the screen 110 or other such user interface an alert via the UI module 132 if the privacy information designated for being shared violates user profile data 144 or other privacy settings 114 (e.g. do not share list of parameters or forbidden websites). The alert may be provided as a push notification (e.g. customized and targeted) to indicate that the amount/type of data to be shared (e.g. either as set by the data sharing control module 142 or otherwise overwritten by the user 103) significantly deviates from the privacy settings 114 (e.g. the number of privacy parameters 118 designated for being shared is double the initial privacy settings 114) or otherwise significantly deviates from other privacy settings as may be set in the user profile data 144.

Figure 5:
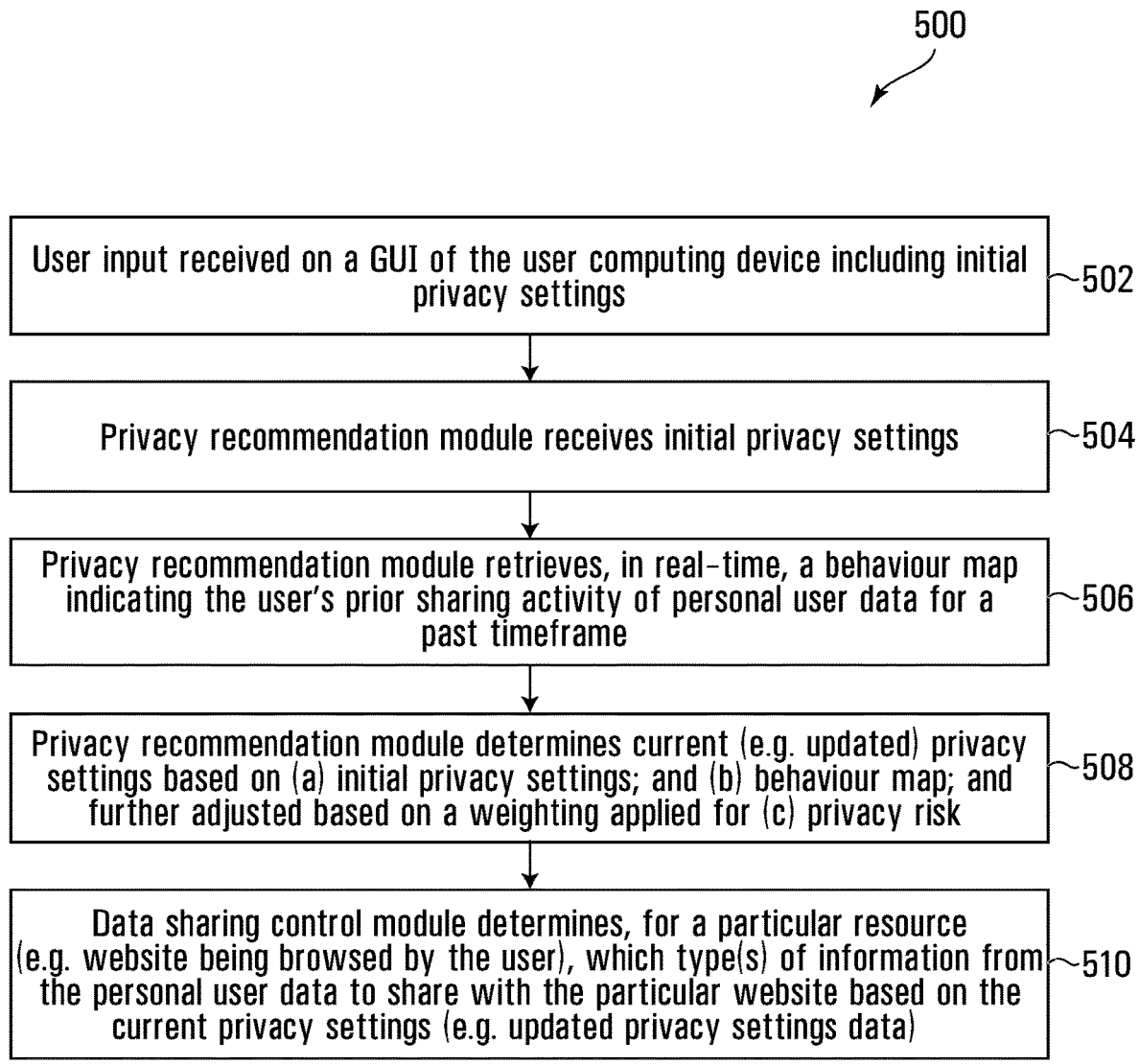
FIGS. 5 and 6 are flowcharts of example operation for the computing device of FIGS. 1 and 2, in accordance with one or more aspects of the present disclosure.

Referring to FIG. 5 shown is a flowchart that illustrates operations 500 of the computing device 102 of FIGS. 1 and 2, in accordance with an aspect of the present disclosure. Operations 500 automatically define the privacy settings for controlling user data shared in response to a requesting device, or more specifically, one or more resources associated with the requesting device.

At 502, the computing device 102 receives a user input on a graphical user interface (GUI) of the computing device defining the initial privacy settings (e.g. privacy settings 114 and corresponding parameters 118). This step may be performed initially upon setup and may be done for example, by selecting a privacy profile 121, which allows defining the privacy settings for particular categories of requestors (e.g. health, investment, or social websites). The user can subsequently adjust the sliders 115 presented on the screen to define one or more privacy parameters 118 (e.g. date of birth, social insurance number, user identification information, age, financial demographics, etc.) to be shared with the requestor upon online interaction with the requestor 104 (e.g. visiting a website). In yet another embodiment, the privacy parameters 118 can relate to one of more parameters gathered for the user 103 when interacting with one or more connected smart devices (e.g. wearable device) such as IoT devices including health statistics gathered from smart wearable devices for the user 103; or data for the smart home device or smart security device, etc. associated with the user 103. Other such examples may be envisaged. Communications protocols for the computing device 102 to communicate with a particular requesting device 104 being an IoT device includes but not limited to: CoAP, DTLS, MQTT; wireless protocols including but not limited to: IPv6, LPWAN, Zigbee, Bluetooth Low Energy, Z-Wave, RFID and NFC. In alternative aspects, cellular, satellite, Wi-Fi or Ethernet can be used as the communications network 108.

Upon receiving a query for personal user data from a requesting device 104 (e.g. upon visiting a website associated with the requesting device 104 or otherwise interacting online with the requesting device 104), at 504, the privacy recommendation module 138 of the computing device 102, receives the initial privacy settings 114 (e.g. having corresponding parameters 118). At 506, the process retrieves (e.g. from the user profile data 144 tracking online profile and behaviour of the user) in real-time, a behaviour map (e.g. the behaviour map 310 of FIG. 3) indicating the user's prior sharing activity of personal user data for a past time frame from the current time frame.

At 508, the privacy recommendation module 138 may use a machine learning algorithm (e.g. as provided by the module 136) to forecast the previously defined privacy settings 114, and the received behaviour map (e.g. the behaviour map 310 of FIG. 3) to predict optimal current privacy settings for the user from the current time to a future time. That is, the behaviour map may indicate for example that the user is more active in sharing during certain periods, or is more willing to share user data with certain requestor websites; or has actually shared more than the initial privacy settings 114 indicated. Thus, the forecasted privacy settings define more optimal current privacy settings. In at least some aspects, the forecasted privacy settings are further adjusted based on risk scores 116 associated with corresponding requesting devices 104. That is, the risk scores 116 may be applied as a defined weighting to either expand the privacy settings 114 and their corresponding parameters (e.g. beyond the initial range defined by the initial privacy settings 114) in the case of a low risk score 116 or to decrease the privacy settings (e.g. reduce the range of parameters 118) in the case of a high risk score. For example, a higher risk score could be indicative that the requestor, e.g. website being accessed is associated with data breaches. Once the weighting is applied to the forecasted privacy settings, the updated privacy settings data 114' may be generated to define an updated range of privacy parameters 118.

At step 510, the updated privacy settings data 114' are used by the data sharing control module 142 in controlling amount and/or type of data sharing (e.g. as defined by the updated privacy parameters 118) when interacting online with a requesting device 104 (e.g. browsing a particular website). Notably, the updated privacy settings 114' indicate type(s) of personal user data (e.g. SIN, birthdate, username, other identification information) acceptable for sharing with the particular requestor (e.g. website) from the current time.

Figure 6:
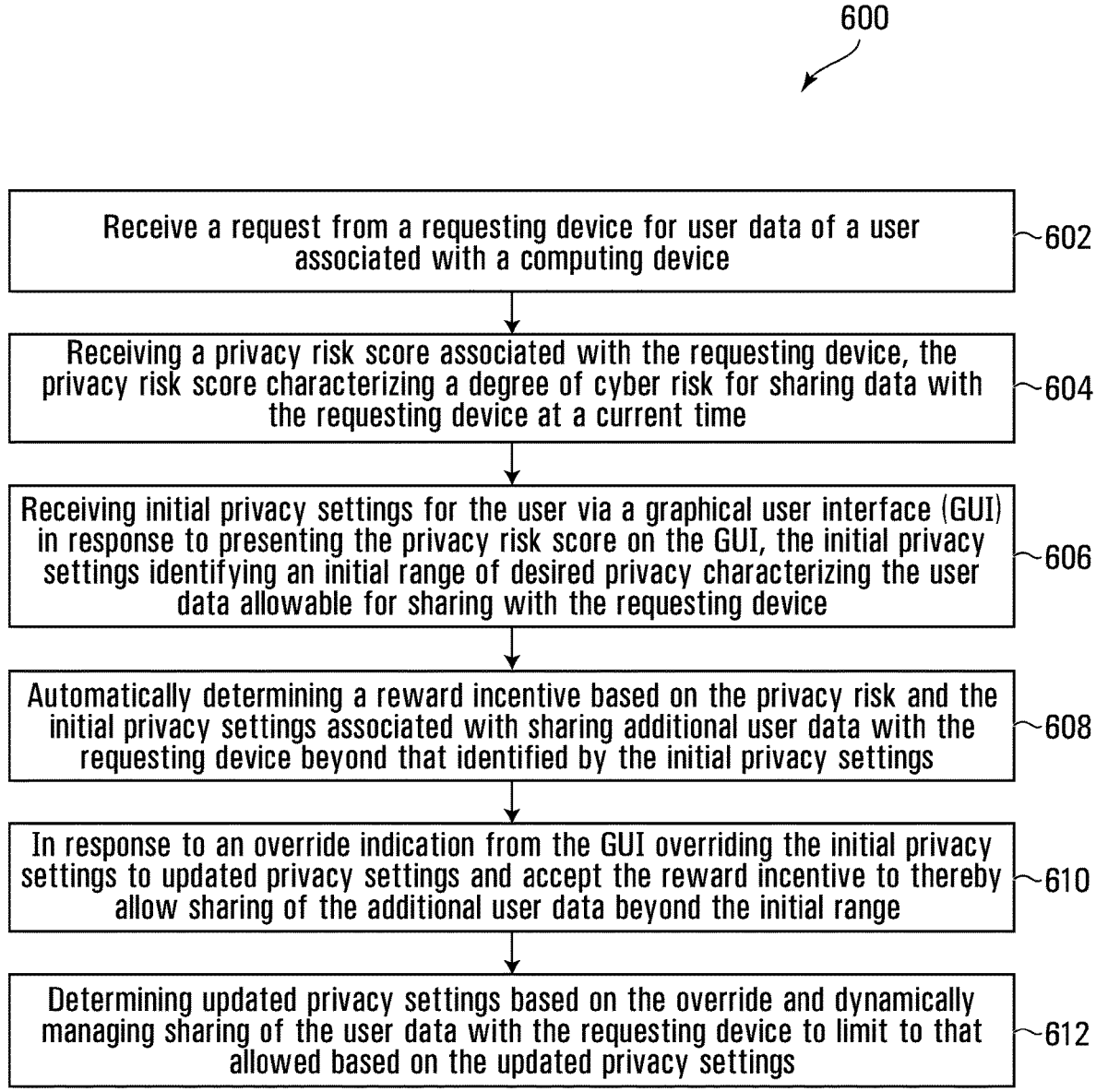

Referring to FIG. 6 shown is a flowchart illustrating operations 600 of a computing device (e.g. as shown in FIGS. 1 and 2), in accordance with an aspect of the present disclosure. Operations 600 define reward incentives corresponding to the additional sharing of the user data by the computing device 102 with the requesting device 104 for subsequent acceptance of the reward incentive by the user and thereby effecting a payment processing relating to the accepted reward incentives.

At 602, the computing device 102 may receive a request from a requesting device 104 (or an associated resource) for personal user data for a user 103. The request may occur in response to interacting online with the requesting device 104 (e.g. browsing to a particular website hosted by the requesting device 104). At 604, the computing device 102 receives a privacy risk score 116 associated with the requesting device 104, the privacy risk score 116 characterizes the degree of cyber security risk for sharing data with the requesting device at the current time. The privacy risk score 116 may be stored within the storage device 130 or obtained from the intermediary device 106 in communication with the computing device 102 and the requesting device 104. For example, in one aspect, the privacy risk score may be based upon a device type for the requesting device 104 (or associated with a category type for the requesting resource—such as social media website; health website; investment website; education, etc.). In another aspect, the privacy risk score 116 may be further based on a location of the requesting device 104 relative to the computing device 102 (e.g. proximity) as described earlier.

At 606, the initial privacy settings 114 for the user are received via a graphical user interface (GUI) similar to step 502 and further in response to displaying the privacy risk score on the GUI such that the initial privacy settings 114 define an initial range of desired privacy characterizing the user data (and associated data types as defined by the parameters 118) allowable for sharing with the requesting device 104.

At 608, the computing device 102 determines potential reward incentives 112 for various privacy settings 114. In at least one aspect, the reward incentive 112 is based on the privacy risk score 116 for the requesting device 104 and the selected privacy settings 114 having associated privacy parameters 118 (see process 400 of FIG. 4). For example, the reward incentive 112 may display the corresponding reward for sharing additional user data with the requesting device 104 beyond that identified by the initial privacy settings 114.

At 610, the computing device 102 is configured to listen for adjustments made to the privacy settings 114. In response to overriding the initial privacy settings 114 to accept the reward incentive 112 to allow sharing of the additional user data beyond the initial range defined by the initial privacy settings, the initial privacy settings 114 are modified to the updated privacy settings 114' according to the reward incentive 112 accepted. This may include effecting a transfer of financial funds to the computing device 102 in response to accepting the reward incentive 112. At 612, the computing device 102 further dynamically manages sharing of the user data with the requesting device 104 to limit the user data according to that allowed based on the updated privacy settings 114' for the accepted reward incentive 112 (and corresponding updated privacy parameters 118 to be shared).

In a further aspect, dynamically managing sharing of the user data to limit to only the selected one or more current data types (e.g. privacy parameters 118) based on the updated privacy settings is further permitted based on the privacy risk score 116 being below a defined threshold to permit said sharing. That is, in some aspects, if the privacy risk score 116 is beyond a threshold, a weighting may further be applied to reduce the scope of the privacy parameters 118 being shared according the updated privacy settings 114'.

As such, the examples and flowchart show, a computing device comprising a processor; a communications component coupled to the processor; and a storage device coupled to the processor, the storage device storing instructions to configure operation of the computing device when executed by the processor for managing sharing of user data when interacting online with a requesting device, the instructions configuring the processor for: receiving a privacy risk score associated with the requesting device, the privacy risk score characterizing a degree of cyber risk for sharing data with the requesting device at a current time; receiving initial privacy settings for the user via a graphical user interface (GUI) in response to presenting the privacy risk score on the GUI, the initial privacy settings identifying an initial range of desired privacy characterizing the user data allowable for sharing with the requesting device; automatically determining and presenting on the GUI, a reward incentive based on the privacy risk and the initial privacy settings associated with sharing additional user data with the requesting device beyond that identified by the initial privacy settings, the reward incentive being correlated to a degree of the additional user data shared; upon receiving an override indication from the GUI overriding the initial privacy settings to accept the reward incentive and thereby allow sharing of the additional user data beyond the initial range, then: determining updated privacy settings based on the override indication; and dynamically managing sharing of the user data with the requesting device to limit to that allowed based on the updated privacy settings.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Various embodiments of the invention have been described. These and other embodiments are within the scope of the following claims.

What is claimed is:

1. A computing device having a processor coupled to a memory and coupled to an I/O device for managing sharing of user data associated with a user via the computing device when interacting online with a requesting device, the memory storing instructions, which when executed by the processor configure the computing device to:
receive a query, from the requesting device, to share data associated with the user of the computing device with the requesting device;
receive, in response to the query, a privacy risk score associated with the requesting device from an intermediary device in communication with the computing device and the requesting device, the privacy risk score characterizing a degree of cyber risk for sharing the data associated with the user of the computing device with the requesting device at a current time, the privacy risk score providing a current risk for the requesting device, the privacy risk score automatically determined for the requesting device based on a correlation of historical data for the requesting device to the privacy risk score comprising at least one of: a device type for the requesting device, a location of the requesting device relative to the computing device, and prior history of access of user data by the requesting device;
generate a graphical user interface (GUI) for the I/O device, the GUI comprising a screen having an interactive set of GUI elements presenting: the privacy risk score providing a current cyber security risk to the user in sharing user data with the requesting device, interactive privacy settings being selectable using at least one slider to define values within a privacy parameter range of the user data, wherein the interactive privacy settings define a current privacy level for the user and the privacy parameter range defines one or more types of user data allowable for sharing with the requesting device and an override indication for receiving an override input;
present the GUI with the interactive set of GUI elements on the I/O device;
subsequent to presenting the GUI comprising the privacy risk score on the screen, detect user interactions through the GUI elements for the interactive privacy settings to select initial privacy settings for the user of the computing device, the initial privacy settings selected via the GUI elements identifying an initial range of desired privacy characterizing the user data allowable for sharing with the requesting device;
automatically determine and present concurrently on the screen of the GUI along with the interactive privacy settings and the privacy risk score, a reward incentive based on the privacy risk score and the initial privacy settings associated with sharing additional user data with the requesting device beyond that identified by the initial privacy settings, the reward incentive being correlated to a degree of the additional user data shared;

upon receiving the override indication from the override input interacting with the GUI elements presented on the GUI overriding the initial privacy settings to accept the reward incentive and thereby allow sharing of the additional user data beyond the initial range, then:
  determine updated privacy settings based on the override indication; and
  dynamically control and manage sharing of the user data when interacting online with the requesting device to limit to that allowed based on the updated privacy settings reflecting updated cyber security risks based on receiving the override indication indicative of accepting the reward incentive and corresponding privacy parameters to be shared.

2. The device of claim 1 wherein managing sharing of the user data to limit to that allowed comprises the processor being further configured to: limit to only selected one or more data types defined by the updated privacy settings.

3. The device of claim 1 further comprising the reward incentive determined further based on a pre-defined value associated with each type of the user data shared online.

4. The device of claim 1, wherein the reward incentive is a digital asset selected from a group comprising: loyalty points, rewards points, cryptocurrency, and cash.

5. The device of claim 2 wherein the data type of the user data is selected from a possible set of types comprising: online presence information, user name, social insurance number, date of birth, and identification information from the user data that is allowable for sharing online.

6. The device of claim 2, wherein in response to interacting online with the requesting device, the processor is further configured to:
  obtain the privacy risk score for the requesting device from an intermediary device in communication with the computing device and the requesting device; and
  wherein dynamically managing sharing of the user data to limit to only the selected one or more data types based on the updated privacy settings is further permitted based on the privacy risk score being below a defined threshold to permit said sharing.

7. The device of claim 6 wherein if the privacy risk score is below the defined threshold but above a second defined threshold, the processor is further configured to:
  adjust the sharing of the user data defined by the updated privacy settings to further limit to only a subset of the selected one or more data types.

8. The device of claim 6, wherein the requesting device is a device connected online to the computing device and configured to request the user data while interacting online, the requesting device selected from a group comprising: a mobile device; an augmented reality device; a virtual reality device; a personal computer; a server hosting one or more websites; an internet of things (IoT) device; and a personal digital assistant.

9. The device of claim 1, wherein the processor is further configured for updating the initial privacy settings subsequent to the current time based on:
  obtaining a behaviour map for the user associated with the user data over a past time period from the current time, the behaviour map characterizing online sharing activity of prior user data and comprising a set of past data types shared and indicating a number of times the set of past data types have been shared online in the past time period; and
  updating the initial privacy settings in real-time based on the behaviour map and thereby the reward incentive.

10. The device of claim 9 wherein the processor is further configured to automatically update the initial privacy settings further based on:
  retrieving a set of attributes characterizing the user;
  determining at least one other user of another computing device having a profile with attributes similar to the user;
  obtaining a second behaviour map for the at least one other user over a second past time period, the second behaviour map comprising a second set of past data types shared online by the at least one other user during the second past time period; and
  further updating the initial privacy settings based on the second behaviour map.

11. A computer-implemented method for managing sharing of user data associated with a user via a computing device when interacting online with a requesting device, the method comprising:
  receiving a query, from the requesting device, to share data associated with the user of the computing device with the requesting device;
  receiving, in response to the query, a privacy risk score associated with the requesting device from an intermediary device in communication with the computing device and the requesting device, the privacy risk score characterizing a degree of cyber risk for sharing the data associated with the user of the computing device with the requesting device at a current time, the privacy risk score providing a current risk for the requesting computing device, the privacy risk score automatically determined for the requesting device based on a correlation of historical data for the requesting device to the privacy risk score comprising at least one of: a device type for the requesting device, a location of the requesting device relative to the computing device, and prior history of access of user data by the requesting device;
  generate a graphical user interface (GUI) for the I/O device, the GUI comprising a screen having an interactive set of GUI elements presenting: the privacy risk score providing a current cyber security risk to the user in sharing user data with the requesting device, interactive privacy settings being selectable using at least one slider to define values within a privacy parameter range of the user data, wherein the interactive privacy settings define a current privacy level for the user and the privacy parameter range defines one or more types of user data allowable for sharing with the requesting device and an override indication for receiving an override input;
  presenting the GUI with the interactive set of GUI elements on the I/O device;
  subsequent to presenting the GUI comprising the privacy risk score on the screen, detecting user interactions through the GUI elements for the interactive privacy settings to select initial privacy settings for the user of the computing device, the initial privacy settings selected via the GUI elements identifying an initial range of desired privacy characterizing the user data allowable for sharing with the requesting device;
  automatically determining and presenting concurrently on the screen of the GUI along with the interactive privacy settings and the privacy risk score, a reward incentive based on the privacy risk score and the initial privacy settings associated with sharing additional user data with the requesting device beyond that identified by the initial privacy settings, the reward incentive being correlated to a degree of the additional user data shared;

upon receiving the override indication from the override input interacting with the GUI elements presented on the GUI overriding the initial privacy settings to accept the reward incentive and thereby allow sharing of the additional user data beyond the initial range, then:

determining updated privacy settings based on the override indication; and dynamically controlling and managing sharing of the user data when interacting online with the requesting device to limit to that allowed based on the updated privacy settings reflecting updated cyber security risks based on receiving the override indication indicative of accepting the reward incentive and corresponding privacy parameters to be shared.

12. The method of claim 11 wherein managing sharing of the user data to limit to that allowed comprises limiting to only selected one or more data types defined by the updated privacy settings.

13. The method of claim 11 further comprising the reward incentive determined further based on a pre-defined value associated with each type of the user data shared online.

14. The method of claim 11, wherein the reward incentive is a digital asset selected from a group comprising: loyalty points, rewards points, cryptocurrency, and cash.

15. The method of claim 12 wherein the data type of the user data is selected from a possible set of types comprising: online presence information, user name, social insurance number, date of birth, and identification information from the user data that is allowable for sharing online.

16. The method of claim 12, wherein in response to interacting online with the requesting device, the method further comprises:

obtaining the privacy risk score for the requesting device from an intermediary device in communication with the computing device and the requesting device; and wherein dynamically managing sharing of the user data to limit to only the selected one or more data types based on the updated privacy settings is further permitted based on the privacy risk score being below a defined threshold to permit said sharing.

17. The method of claim 16 wherein if the privacy risk score is below the defined threshold but above a second defined threshold, the method further comprises:

adjusting the sharing of the user data defined by the updated privacy settings to further limit to only a subset of the selected one or more data types.

18. The method of claim 16, wherein the requesting device is a device connected online to the computing device and configured to request the user data while interacting online, the requesting device selected from a group comprising: a mobile device; an augmented reality device; a virtual reality device; a personal computer; a server hosting websites; an internet of things (IoT) device; and a personal digital assistant.

19. The method of claim 11, wherein the initial privacy settings are automatically updated subsequent to the current time based on:

obtaining a behaviour map for the user associated with the user data over a past time period from the current time, the behaviour map characterizing online sharing activity of prior user data and comprising a set of past data types shared and indicating a number of times the set of past data types have been shared online in the past time period; and updating the initial privacy settings in real-time based on the behaviour map and thereby the reward incentive.

20. The method of claim 19 further comprising automatically updating the initial privacy settings further based on:

retrieving a set of attributes characterizing the user;

determining at least one other user of another computing device having a profile with attributes similar to the user;

obtaining a second behaviour map for the at least one other user over a second past time period, the second behaviour map comprising a second set of past data types shared online by the at least one other user during the second past time period; and further updating the initial privacy settings based on the second behaviour map.

21. A computer readable medium comprising a non-transitory device storing instructions and/or data, which when executed by a processor of a computing device, the processor coupled to a memory, configure the computing device to:

receive a query, from the requesting device, to share data associated with the user the computing device with the requesting device;

receive, in response to the query, a privacy risk score associated with the requesting device from an intermediary device in communication with the computing device and the requesting device, the privacy risk score characterizing a degree of cyber risk for sharing the data associated with the user of the computing device with the requesting device at a current time, the privacy risk score providing a current risk for the requesting computing device, the privacy risk score automatically determined for the requesting device comprising at least one of: a device type for the requesting device, a location of the requesting device relative to the computing device, and prior history of access of user data by the requesting device;

generate a graphical user interface (GUI) for the I/O device, the GUI comprising a screen having an interactive set of GUI elements presenting: the privacy risk score providing a current cyber security risk to the user in sharing user data with the requesting device, interactive privacy settings being selectable using at least one slider to define values within a privacy parameter range of the user data, wherein the interactive privacy settings define a current privacy level for the user and the privacy parameter range defines one or more types of user data allowable for sharing with the requesting device and an override indication for receiving an override input;

present the GUI with the interactive set of GUI elements on the I/O device;

present the GUI displaying the privacy risk score associated with the requesting device, received from an intermediary device in communication with the computing device and the requesting device, the privacy risk score characterizing a degree of cyber risk for sharing data associated with the user of the computing device with the requesting device at a current time, the privacy risk score automatically determined for the requesting device and dependent upon at least one of: a device type for the requesting device, a location of the requesting device relative to the computing device, and prior history of access of user data by the requesting device;

prompt for user input on the screen of the GUI to receive initial privacy settings for the user via the GUI in response to presenting the privacy risk score on the GUI, the initial privacy settings identifying an initial range of desired privacy characterizing the user data allowable for sharing with the requesting device;

automatically determine and present concurrently on the screen of the GUI along with the interactive privacy settings and the privacy risk score, a reward incentive based on the privacy risk score and the initial privacy settings associated with sharing additional user data with the requesting device beyond that identified by the initial privacy settings, the reward incentive being correlated to a degree of the additional user data shared;

upon receiving the override indication from the override input interacting with the GUI elements presented on the GUI overriding the initial privacy settings to accept the reward incentive and thereby allow sharing of the additional user data beyond the initial range, then:

determine updated privacy settings based on the override indication; and dynamically control and manage sharing of the user data when interacting online with the requesting device to limit to that allowed based on the updated privacy settings reflecting updated cyber security risks based on receiving the override indication indicative of accepting the reward incentive and corresponding privacy parameters to be shared.

* * * * *